(12) United States Patent
Yang et al.

(10) Patent No.: US 10,511,203 B2
(45) Date of Patent: Dec. 17, 2019

(54) MOTOR STATOR STRUCTURE

(71) Applicant: ASIA VITAL COMPONENTS CO., LTD., New Taipei (TW)

(72) Inventors: Ching-Min Yang, New Taipei (TW); Kuo-Chen Chang, New Taipei (TW); Yen-Chih Lu, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 278 days.

(21) Appl. No.: 15/653,533

(22) Filed: Jul. 19, 2017

(65) Prior Publication Data

US 2019/0027991 A1    Jan. 24, 2019

(51) Int. Cl.
*H02K 1/06* (2006.01)
*H02K 3/493* (2006.01)
*H02K 3/51* (2006.01)
*H02K 1/18* (2006.01)
*H02K 1/16* (2006.01)

(52) U.S. Cl.
CPC ............. *H02K 3/493* (2013.01); *H02K 1/185* (2013.01); *H02K 3/51* (2013.01); *H02K 1/165* (2013.01)

(58) Field of Classification Search
CPC ............. H02K 3/493; H02K 3/51; H02K 1/18
USPC .................................................. 310/216.079
See application file for complete search history.

(56) References Cited

U.S. PATENT DOCUMENTS

| | | | | |
|---|---|---|---|---|
| 5,057,733 A | * | 10/1991 | Sonoda | H02K 1/148 29/596 |
| 5,852,335 A | * | 12/1998 | Suzuki | H02K 1/148 310/254.1 |
| 5,990,584 A | | 11/1999 | Luo et al. | |
| 6,815,861 B2 | * | 11/2004 | Suzuki | H02K 1/185 310/216.101 |
| 6,822,356 B2 | * | 11/2004 | Suzuki | H02K 3/522 310/43 |
| 2002/0163275 A1 | | 11/2002 | Hsu | |

FOREIGN PATENT DOCUMENTS

CN 105071561 A 11/2015
TW M407544 U1 7/2011

* cited by examiner

*Primary Examiner* — Hanh N Nguyen
(74) *Attorney, Agent, or Firm* — Thomas J. Nikolai; DeWitt LLP

(57) ABSTRACT

A motor stator structure includes a main body and multiple stopper plates. The main body has multiple magnetic poles and a shaft hole. The magnetic poles outward extend from the main body. Each magnetic pole has a free end outward extending from the main body. The shaft hole passes through the main body between two ends thereof. The stopper plates are respectively correspondingly assembled with the free ends of the magnetic poles. In the motor stator structure, the windings are more densely wound on the magnetic poles to enhance the magnetization efficiency.

5 Claims, 5 Drawing Sheets

MOTOR STATOR STRUCTURE

BACKGROUND OF THE INVENTION

1. Field of the Invention

The present invention relates generally to a motor stator structure, and more particularly to a motor stator structure in which the windings are more densely wound on the magnetic poles to enhance the magnetization effect.

2. Description of the Related Art

It is known that electrical energy is provided for the windings of the stator of a motor to create induced magnetic field. The magnetic field interacts with the magnetic member of the rotor around the stator to convert the electrical energy into dynamic energy so that the rotor of the motor can operate. The stator is mainly composed of multiple silicon steel sheets, which are stacked to form a stator main body with multiple magnetic poles. The magnetic poles are arranged at intervals to define therebetween a receiving space. A free end of each magnetic pole has a stopper section. With respect to a traditional stator, the windings are mainly wound on the magnetic poles manually. In order to mass-produce the motors, a winding apparatus has been developed to wind the windings on the magnetic poles.

The windings are wound on the magnetic poles to occupy the receiving space. The stopper sections serve to prevent the windings from dropping out. When winding the windings on the magnetic poles, the stopper sections often hinder the windings from being fully wound in the entire receiving space. Also, the windings can be hardly uniformly wound on the magnetic poles. This will affect the induction magnetization efficiency between the stator and the rotor. As a result, the operation performance of the motor will be deteriorated.

It is therefore tried by the applicant to provide a motor stator structure in which the windings are more densely wound on the magnetic poles to enhance the induction magnetization efficiency between the stator and the rotor.

SUMMARY OF THE INVENTION

It is therefore a primary object of the present invention to provide a motor stator structure in which the windings are more densely wound on the magnetic poles to enhance the magnetization effect.

To achieve the above and other objects, the motor stator structure of the present invention includes a main body and multiple stopper plates.

The main body has multiple magnetic poles and a shaft hole. The magnetic poles outward extend from the main body. Each magnetic pole has a free end outward extending from the main body. The shaft hole passes through the main body between two ends thereof. The stopper plates are respectively correspondingly assembled with the free ends of the magnetic poles.

In the motor stator structure of the present invention, the windings are wound around the magnetic poles and the stopper plates serve to prevent the windings from dropping out. The stopper plates are connected with the free ends of the magnetic poles by way of assembling process. In this case, when winding the windings, the stopper plates will not hinder the winding operation and the windings can be uniformly fully wound to occupy the entire receiving space. Accordingly, the induction magnetization efficiency between the stator and the rotor can be enhanced to promote the operation performance of the motor.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
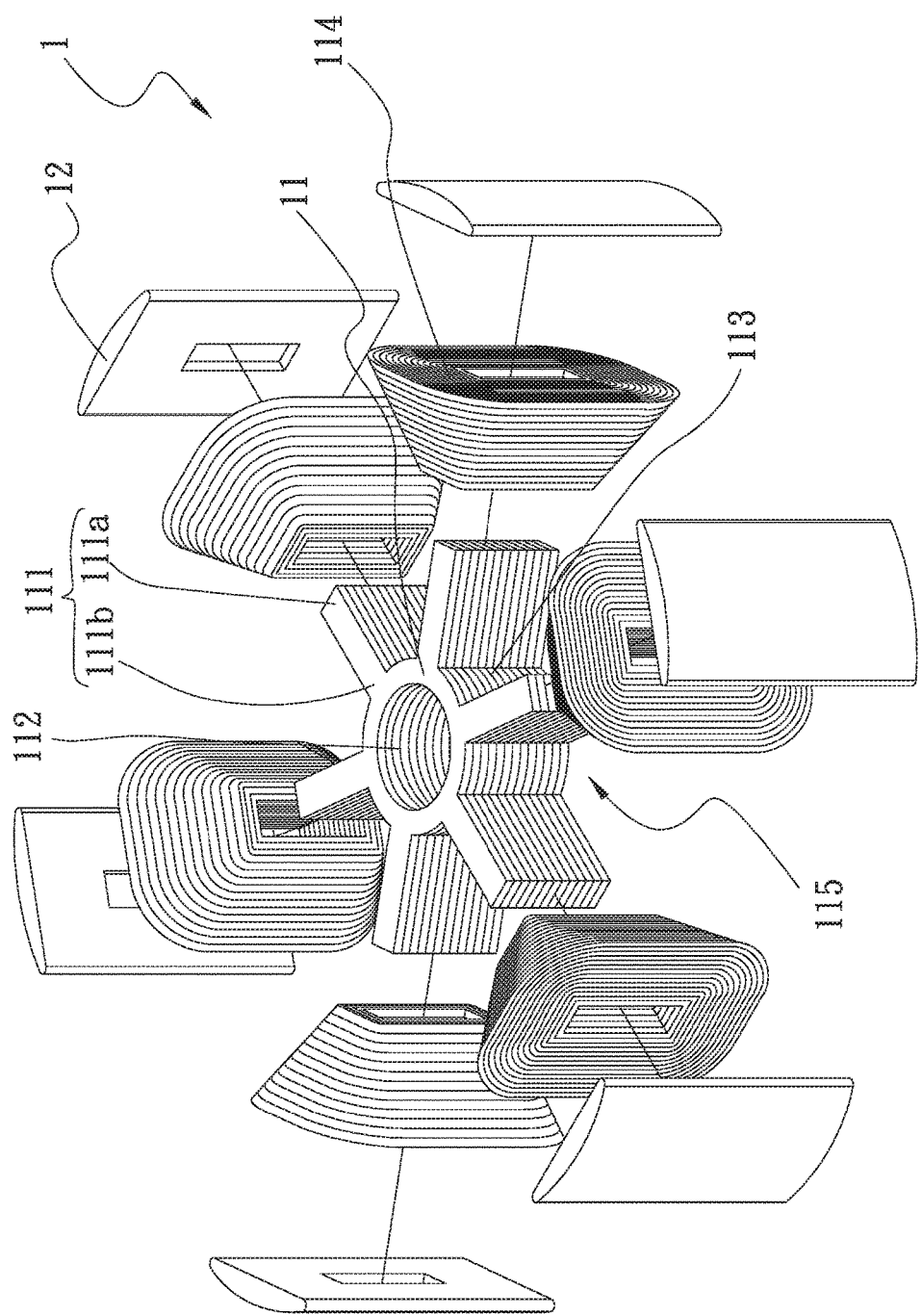
FIG. 1 is a perspective exploded view of a first embodiment of the motor stator structure of the present invention.
Figure 2:
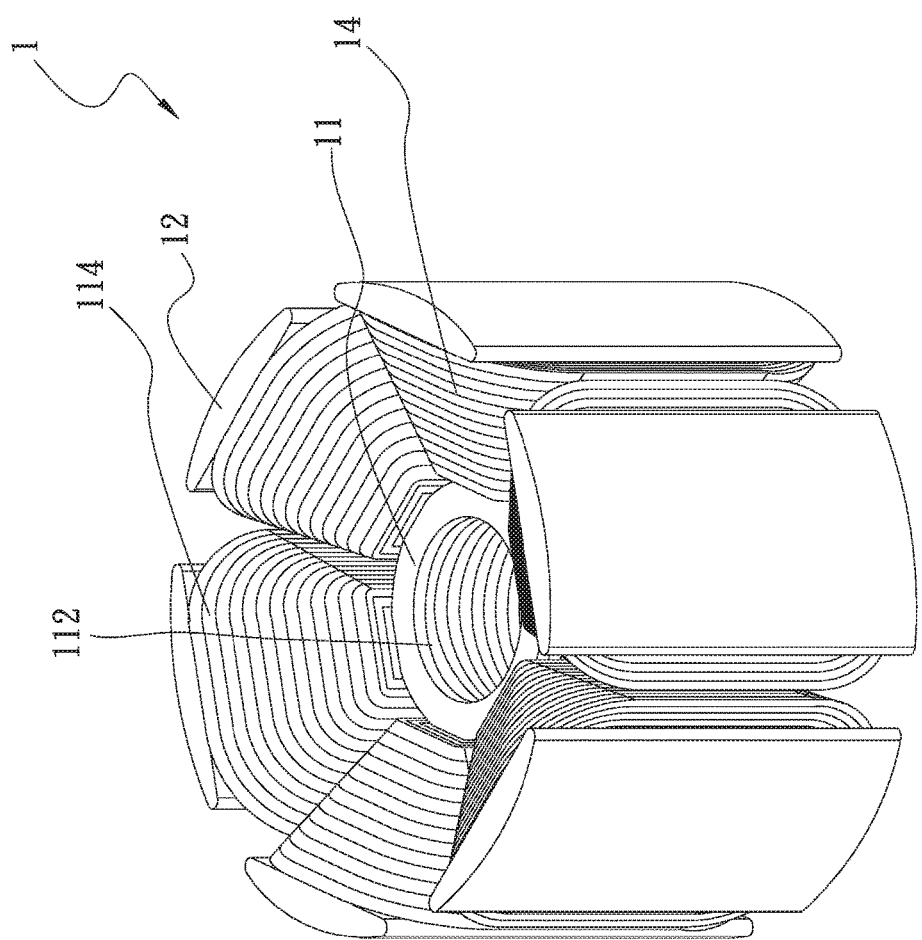
FIG. 2 is a perspective assembled view of the first embodiment of the motor stator structure of the present invention.

Please refer to FIGS. 1 and 2. FIG. 1 is a perspective exploded view of a first embodiment of the motor stator structure of the present invention. FIG. 2 is a perspective assembled view of the first embodiment of the motor stator structure of the present invention. According to the first embodiment, the motor stator structure 1 of the present invention includes a main body 1 and multiple stopper plates 12.

The main body 11 has multiple magnetic poles 111 and a shaft hole 112. The magnetic poles 111 outward extend from the main body 11 and are annularly arranged on the outer circumference of the main body 11. Each magnetic pole 111 has a free end 111a outward extending from the main body 11. The shaft hole 112 passes through the main body 11 between two ends thereof. The main body 11 is composed of multiple silicon steel sheets 113 stacked on each other.

The stopper plates 12 are respectively correspondingly assembled with the free ends 111a of the magnetic poles 111. Multiple windings 114 are wound around the magnetic poles 111.

Figure 3A:
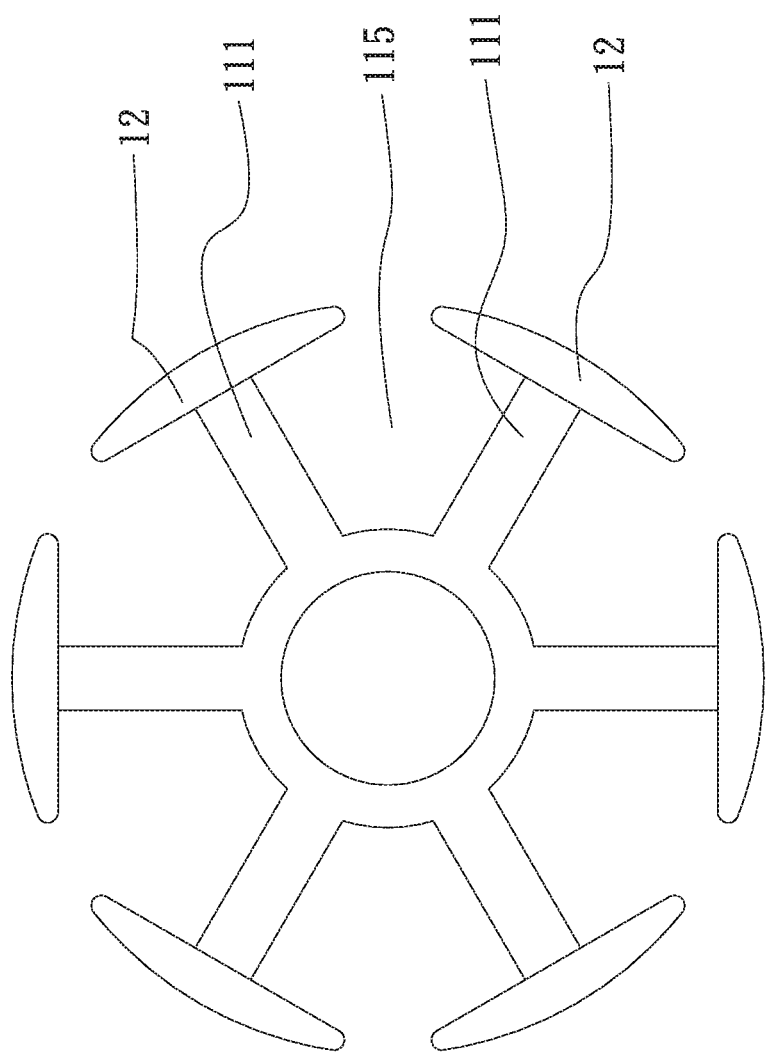
FIG. 3a is a top view of a second embodiment of the motor stator structure of the present invention.
Figure 3B:
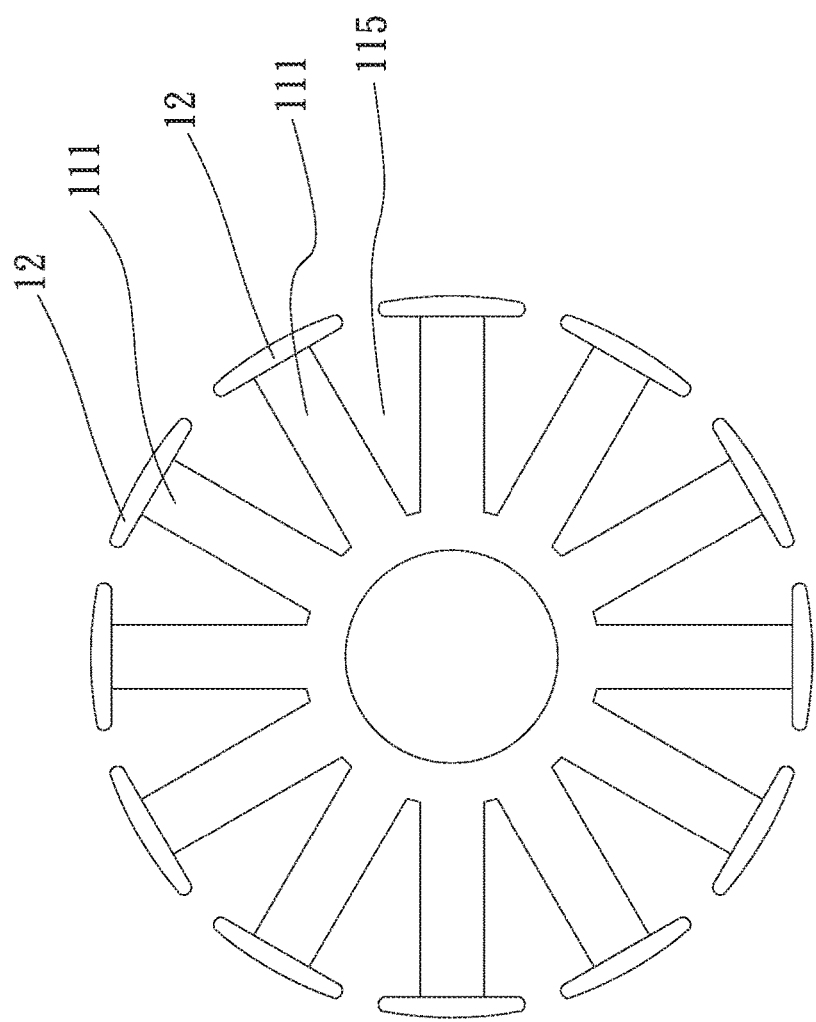
FIG. 3b is a top view of the second embodiment of the motor stator structure of the present invention.

Please now refer to FIGS. 3a and 3b. FIG. 3a is a top view of a second embodiment of the motor stator structure of the present invention. FIG. 3b is a top view of the second embodiment of the motor stator structure of the present invention. The second embodiment is partially identical to the first embodiment in structure and thus will not be repeatedly described hereinafter. The second embodiment is different from the first embodiment in that the second embodiment has a receiving space 115. The receiving space 115 is defined by the adjacent magnetic poles 111 and the stopper plates 12. The configuration and size of the receiving space 115 are related to the number of the magnetic poles 111 and the distance between the magnetic poles 111.

In the case that the number of the magnetic poles 111 is less, then the receiving space 115 is larger and the receiving space 115 has a quadrangular configuration. In the case that the number of the magnetic poles 111 is more, then the receiving space 115 is smaller and the receiving space 115 has a triangular configuration.

Figure 4:
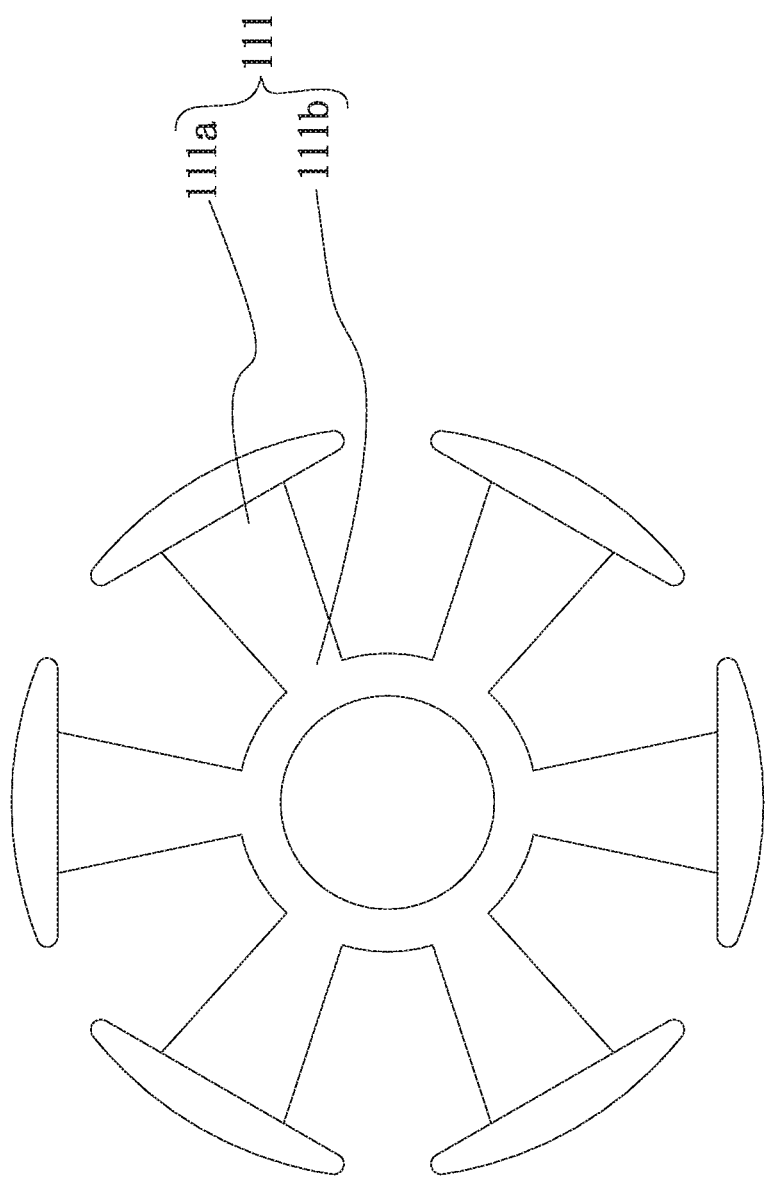
FIG. 4 is a top view of a third embodiment of the motor stator structure of the present invention.

Please now refer to FIG. 4, which is a top view of a third embodiment of the motor stator structure of the present invention. In the third embodiment, each magnetic pole 111 has a connection end 111b opposite to the free end 111a. The connection end 111b is connected with the main body 11. The width of the free end 111a is larger than the width of the connection end 111b.

The major object of the present invention is to connect the stopper plates 12 with the tail ends (the free ends 111a) of the magnetic poles 111 by way of assembling process. In this case, when winding the windings, the stopper plates 12 will not hinder the winding operation and the windings can be uniformly fully wound to occupy the entire receiving space 115. Finally, the stopper plates 12 are connected with the free ends 111a of the magnetic poles 111 to restrict the windings 114 from dropping.

The motor stator structure of the present invention can improve the problem of the conventional stator structure that the wires can be hardly uniformly wound on the magnetic poles 111. In the present invention, the wires can be uniformly wound on magnetic poles 111. Also, the windings 114 can be respectively wound on the magnetic poles 111 with specific configuration.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A motor stator structure comprising:
    a main body having multiple magnetic poles and a shaft hole, the magnetic poles outward extending from the main body, each magnetic pole having a free end outward extending from the main body and a connection end opposite to the free end, the connection ends being connected with the main body, the shaft hole passing through the main body between two ends thereof; and
    multiple stopper plates respectively correspondingly assembled with the free ends of the magnetic poles;
    wherein a width of the free end is larger than a width of the connection end.

2. The motor stator structure as claimed in claim 1, wherein multiple windings are wound around the magnetic poles.

3. The motor stator structure as claimed in claim 1, wherein the main body is composed of multiple silicon steel sheets stacked on each other.

4. The motor stator structure as claimed in claim 1, wherein the magnetic poles are annularly arranged on an outer circumference of the main body.

5. The motor stator structure as claimed in claim 1, wherein a receiving space is defined between the adjacent magnetic poles.

* * * * *